United States Patent
Chu (10) Patent No.: US 8,432,483 B2
(45) Date of Patent: Apr. 30, 2013

(54) SYSTEM AND METHOD FOR CHARGING AN ELECTRONIC DEVICE

(75) Inventor: Joseph Yao-Hua Chu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 351 days.

(21) Appl. No.: 12/837,384

(22) Filed: Jul. 15, 2010

(65) Prior Publication Data

US 2012/0013790 A1    Jan. 19, 2012

(51) Int. Cl.
 *H04N 5/225* (2006.01)
 *H02J 7/00* (2006.01)
(52) U.S. Cl.
 USPC ............ 348/372; 348/375; 320/108; 320/115
(58) Field of Classification Search .................. 348/372, 348/375, 373, 376, 207.99; 320/103, 108, 320/115
See application file for complete search history.

(56) References Cited

U.S. PATENT DOCUMENTS

| | | | | |
|---|---|---|---|---|
| 6,653,814 B1* | 11/2003 | Patino | ........................... | 320/103 |
| 7,940,312 B2* | 5/2011 | Senda | ........................ | 348/207.1 |
| 2004/0257464 A1* | 12/2004 | Pandit et al. | .................. | 348/372 |
| 2009/0033748 A1* | 2/2009 | Ejima et al. | ................ | 348/207.1 |
| 2010/0295960 A1* | 11/2010 | Furlan et al. | ............... | 348/222.1 |

* cited by examiner

*Primary Examiner* — Nhan T Tran
(74) *Attorney, Agent, or Firm* — Patterson & Sheridan LLP

(57) ABSTRACT

A method that includes determining that a device mount power supply included within a device mount is compatible with an electronic device power supply included in an electronic device. The method further includes receiving power transferred from the device mount power supply via a power connection that is provided by a device mounting adapter that is affixed to the device mount and configured to couple the electronic device and the device mount and align the electronic device and the device mount to facilitate charging the electronic device power supply; and charging the electronic device power supply with power received from the device mount power supply via the power connection.

14 Claims, 7 Drawing Sheets

SYSTEM AND METHOD FOR CHARGING AN ELECTRONIC DEVICE

BACKGROUND

1. Field of the Invention

The present invention relates generally to electronic devices and, more specifically, to a system and method for charging an electronic device.

2. Description of the Related Art

Consumer device technology has developed rapidly over the past decade. A broad variety of consumer devices are now available to meet the diverse needs of a wide spectrum of consumers. An example of a consumer device is a digital video camcorder (DVC) that provides a user with a convenient device that records video and audio and also provides the ability to transfer the recorded video and audio to a computer-readable medium. The computer-readable medium may be, for example, a Digital Video Disc (DVD) or a computer memory.

Some consumer devices, such as the DVC described above, may consume a significant amount of power when capturing and replaying video and audio. DVC devices typically operate using battery power associated with a battery that is included in the DVC. However, DVC battery sizes are limited due to a desire for the overall size of the DVC to remain small. Although battery technology is steadily advancing, conventional battery technology cannot keep pace with elevating power requirements of DVCs that result from increased recording resolutions and other enhanced features.

Accordingly, there remains a need in the art for a technique to maintain the charge associated with a battery included in a consumer device.

SUMMARY

One embodiment of the invention provides a method that includes determining that a device mount power supply included within a device mount is compatible with an electronic device power supply included in an electronic device. The method further includes receiving power transferred from the device mount power supply via a power connection that is provided by a device mounting adapter that is affixed to the device mount and configured to couple the electronic device and the device mount and align the electronic device and the device mount to facilitate charging the electronic device power supply; and charging the electronic device power supply with power received from the device mount power supply via the power connection.

Another embodiment of the invention provides a method that includes determining that a device mount power supply included within a device mount is compatible with an electronic device power supply included in an electronic device. The method further includes receiving power transferred from the device mount power supply via an inductive power connection that is disposed on the device mount at a location other than where a device mounting adapter that is affixed to the device mount is disposed on the device mount, where the device mount adapter is configured to couple the electronic device to the device mount and align the electronic device and the device mount to facilitate charging the electronic device power supply; and charging the electronic device power supply with power received from the device mount power supply via the inductive power connection.

One advantage of embodiments of the invention is that users can operate the device for a longer period of time since the device can be charged while the device is coupled to a device mount.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF EXAMPLE EMBODIMENTS

In the following description, numerous specific details are set forth to provide a more thorough understanding of the invention. However, it will be apparent to one of ordinary skill in the art that the invention may be practiced without one or more of these specific details. In other instances, well-known features have not been described in order to avoid obscuring embodiments of the invention.

Figure 1A:
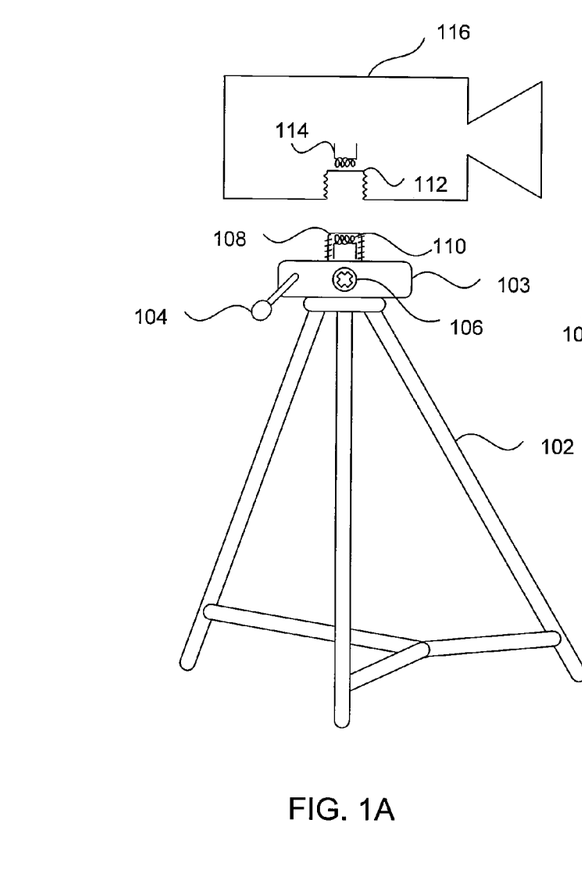
FIGS. 1A-1B are conceptual diagrams illustrating charging a device coupled to a device mount via wireless inductive charging, according to one embodiment of the invention.
Figure 1B:
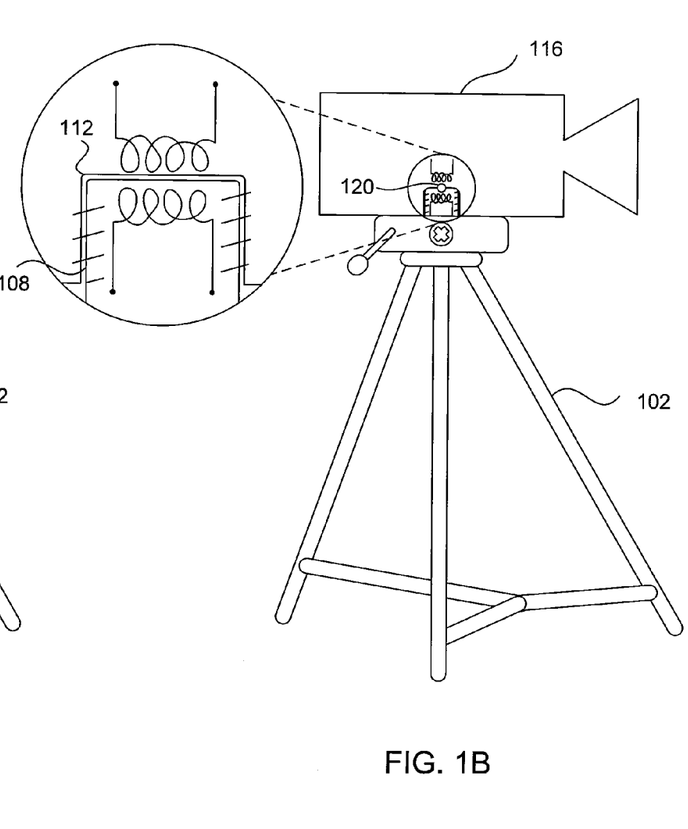

FIGS. 1A-1B are conceptual diagrams illustrating charging a device coupled to a device mount via wireless inductive charging, according to one embodiment of the invention. FIG. 1A illustrates a device mount 102, a head 103, an adjustment lever 104, a lock wheel 106, a first coupling mechanism 108, an inductive power transmitter 110, a second coupling mechanism 112, an inductive power receiver 114, and a device 116.

The device 116 is any electronic device that can be coupled to the device mount 102. In various embodiments, the device 116 may be a device, a camcorder, a handheld device, or the like. For example, the device 116 may be a digital video camcorder (DVC) or digital camera capable of capturing photos and/or videos and manufactured with a second coupling mechanism 112 that allows the device to be coupled to a device mount 102.

The device mount 102 provides stability to the device 116 when the device 116 is coupled to the device mount 102. In some embodiments, the device mount 102 may include a base portion and any number of legs, such as a one leg (i.e., a monopod), two legs (i.e., a double pod), three legs (i.e., a tripod), four legs (i.e., a quad pod), or the like. The legs of the device mount 102 may be stiff or flexible, telescopically retractable, or the like. In alternative embodiments, the device mount 102 may be a solid structure including a cube, a rectangle, or the like.

The device mount 102 includes a head 103 that is configured to couple the device mount 102 to the device 116. In some embodiments, the head 103 allows the device 116 to rotate in three dimensions around the head 103 when the device is coupled to the device mount 102. In one embodiment, the head 103 is integrated into the device mount 102 and the head 103 utilizes a ball and socket joint to allow for maximum directional movement or rotation of the device 116. Such movement or rotation of the device 116 may accomplished using the adjustment lever 104.

The adjustment lever 104 is used to modify the position of the device 116 when the device 116 is coupled to the device mount 102. For example, the adjustment lever can be used to rotate the device 116 in any direction, including horizontal rotation (pan) and vertical pitch (tilt).

The head 103 includes the first coupling mechanism 108 and the device 116 includes the second coupling mechanism 112. The first coupling mechanism 108 and the second coupling mechanism 112 couple the head 103 of the device mount 102 to the device 116. In one embodiment, the first coupling mechanism 108 comprises a device mounting adapter that includes an inductive power transmitter 110, as shown in FIG. 1A and FIG. 1B. In one embodiment, the device mounting adapter comprises a screw. For example, a threaded screw may be ¼-inch, 20-tpi (threads per inch) screw that is made of a non-metallic insulator material. In some embodiments, the first coupling mechanism 108 may be an insulator, so that the inductive power transmitter 110 included in the first coupling mechanism 108 can effectively transmit power with minimal interference to the inductive power receiver 114 included in the device 116. The first coupling mechanism 108 may be threaded to match the second coupling mechanism 112, where the second coupling mechanism 112 is also threaded to receive the first coupling mechanism 108. In alternative embodiments, the first coupling mechanism 108 and the second coupling mechanism 112 are configured as any technically feasible coupling mechanisms, including latches, plugs, switches, a friction fit, or the like.

The lock wheel 106 is used to rotate the first coupling mechanism 108 when mounting the device 116 to the head 103. In one embodiment, rotating the lock wheel 106 counterclockwise causes the first coupling mechanism 108 to be rotated counterclockwise. In alternative embodiments, rotating the lock wheel 106 counterclockwise causes the first coupling mechanism 108 to be rotated clockwise.

FIG. 1B is an illustration of the device 116 coupled to the device mount 102 via the first coupling mechanism 108 and the second coupling mechanism 112, according to one embodiment of the invention. As described in FIG. 1A, the first coupling mechanism 108 and the second coupling mechanism 112 may include an inductive power transmitter 110 and an inductive power receiver 114, respectively. The connection point 120 depicts the power connection that is established when the inductive power transmitter 110 and the inductive power transmitter receiver 114 are aligned and the device 116 is securely coupled to the device mount 102.

The inductive power receiver 114 receives power that is inductively transferred from the inductive power transmitter 110. In one embodiment, when the first coupling mechanism 108 is screwed into the second coupling mechanism 112, as described above, the inductive power transmitter 110 and the inductive power receiver 114 may be in an optimal alignment with one another. In some embodiments, an optimal alignment may be associated with approximately 60% to 70% efficiency when transferring inductive power. Greater efficiency can be achieved by proper alignment between the first coupling mechanism 108 and the second coupling mechanism 112. In one embodiment, the threading mechanism that securely couples the first coupling mechanism 108 and the second coupling mechanism 112 provides an optimal alignment between the respective coils. The threading mechanisms are configured to align a transmitting coil associated with the first coupling mechanism 108 and a receiving coil associated with the second coupling mechanism 112. In some embodiments, the coils align in a two dimensional X-Y sense where the horizontal alignment of the transmitting coil is configured to be parallel and in the horizontal alignment with the receiving coil. In some embodiments, the coils further align in a third dimension (i.e., the Z direction) by controlling the proximity of the transmitting coil and the receiving coil. Such an optimal alignment provides maximum efficiency for inductive power transmission. In one embodiment, when the first coupling mechanism 108 is screwed into the second coupling mechanism 112, a power transfer between the inductive power transmitter 110 and the inductive power receiver 114 begins automatically. Power is then transferred from the device mount 102 to the device 116 by using a power supply associated with the device mount 102 (not shown). In various embodiments, the power supply associated with the device mount 102 may associated with AC (alternating current) or DC (direct current) power supplied from a wall outlet, a battery pack coupled to or included in the device mount 102, reusable and/or replaceable batteries coupled to or included in the device mount 102, and the like.

The wireless inductive power transfer that occurs between the device mount 102 and the device 116 through the connection point 120 provides the advantage of reducing the risk of shock that is typically associated with exposed and non-insulated charging techniques. Specifically, operating the device 116 while the device 116 is coupled to the device mount 102 may require adjustment of the head 103 and the adjustment lever 104. Insulating the inductive power transmitter 110 and the inductive power receiver 114, as illustrated in FIG. 1A and FIG. 1B, minimizes the risk of electrical shock to the user, when compared to non-insulated power connections.

A close-up illustration of the connection point 120 is also provided in FIG. 1B. As shown, a transmitting coil associated with the first coupling mechanism 108 is aligned with a receiving coil associated with the second coupling mechanism 112. In some embodiments, the connection point 120 also provides communication capabilities between the device mount 102 and the device 116. In one embodiment, the inductive power transmitter 110 and the inductive power receiver 114, when in proper alignment, are capable of transmitting communications signals between one another. The communications signals provide a mechanism for transmitting commands from the device mount 102 to the device 116, including recording commands, such as start recording, stop recording, zoom in, zoom out, and the like. Transmitting commands from the device mount 102 to the device 116 advantageously reduces the vibrations or shakes that normally occur when directly manipulating the device 116 while recording when the device 116 is attached to the device mount 102.

Figure 2A:
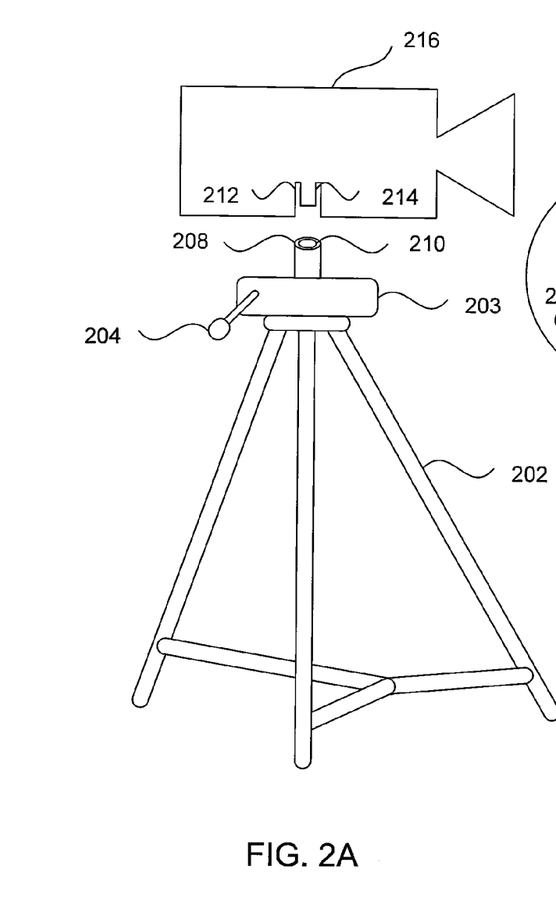
FIGS. 2A-2B are conceptual diagrams illustrating charging a device coupled to a device mount via conductive charging, according to one embodiment of the invention.
Figure 2B:
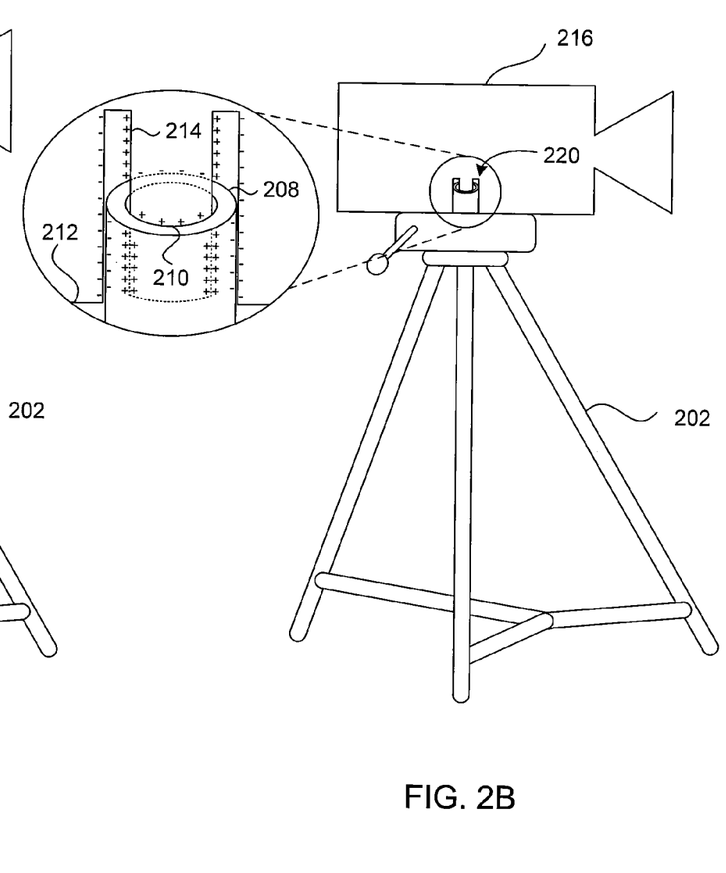

FIGS. 2A-2B are conceptual diagrams illustrating charging a device coupled to a device mount via conductive charging, according to one embodiment of the invention. FIG. 2A illustrates a device mount 202, a head 203, an adjustment lever 204, a first negative polarity coupling mechanism 208, a first positive polarity coupling mechanism 210, a second negative polarity coupling mechanism 212, a second positive polarity coupling mechanism 214, and a device 216.

The device 216 is any electronic device that can be coupled to the device mount 202. In the embodiment shown in FIGS. 2A-2B, the device 216 is coupled to the device mount 202 with a friction fit. In other embodiments, the device 216 may be coupled to the device mount using any technically feasible mechanism, including latches, plugs, switches, threads, or the like. In various embodiments, the device 216 may be a camera, a camcorder, a handheld device, or the like. For example, the device 216 may be a digital video camcorder (DVC). As shown in FIG. 2B and described below, in one embodiment, the first negative polarity coupling mechanism 208 and the first positive polarity coupling mechanism 210 couple the mount 202 to the device 216 through the second negative polarity coupling mechanism 212 and the second positive polarity coupling mechanism 214, respectively.

The device mount 202 provides stability to the device 216 when the device 216 is coupled to the device mount 202. In some embodiments, the device mount 202 provides stability to the device 216 when the device 216 is capturing video and/or audio. For example, the device mount 202 may comprise a tripod that supports the device 216 (e.g., a digital video camera) that is capturing a video. In contrast, an AC power adapter that plugs into a wall outlet and also into a port of the device 216 does not provide stability to the device 216. The AC power adapter provides some nominal support for the device 216, but is not designed to hold and support the device while the device is capturing video and/or audio. Similarly, a dock into which the device 216 may be inserted does not provide stability for the device 216 since the device 216, when in the dock, is not in a position suitable for capturing audio and/or video, according to some embodiments of the invention. In some embodiments, the device mount 202 may include a base portion and any number of legs, such as a one leg (i.e., a monopod), two legs (i.e., a double pod), three legs (i.e., a tripod), four legs (i.e., a quad pod), or the like. The legs of the device mount 202 may be stiff or flexible, telescopically retractable, or the like. In alternative embodiments, the device mount 202 may be a solid structure including a cube, rectangle, or the like. In some embodiments, the device mount 202 may include no legs, such as a mount intended to be strapped to or wrapped around another object.

The device mount 202 includes a head 203 that is configured to couple the device mount 202 to the device 216. In some embodiments, the head 203 allows the device 216 to rotate in three dimensions around the head 203 when the device is coupled to the device mount 202. In one embodiment, the head 203 is integrated into the device mount 202 and the head 203 utilizes a ball and socket joint to allow for maximum directional movement or rotation of the device 216. Such movement or rotation of the device 216 may accomplished using the adjustment lever 204.

The adjustment lever 204 is used to modify the position of the device 216 when the device 216 is coupled to the device mount 202. For example, the adjustment lever can be used to rotate the device 216 in any direction, including horizontal rotation (pan) and vertical pitch (tilt).

The head 203 includes the first negative polarity coupling mechanism 208 and the first positive polarity coupling mechanism 210 and the device 216 includes the second negative polarity coupling mechanism 212 and the second positive polarity coupling mechanism 214. The first negative polarity coupling mechanism 208 and the second negative polarity coupling mechanism 212 couple the head 203 of the device mount 202 to the device 216. In one embodiment, the first negative polarity coupling mechanism 208 comprises a conductive cylinder-shaped element, where the first positive polarity coupling mechanism 210 is included within the center of the first negative polarity coupling mechanism 208. In some embodiments, the first negative polarity coupling mechanism 208 and the first positive polarity coupling mechanism 210 may be gold-plated, so that each mechanism can efficiently transmit power to the second negative polarity coupling mechanism 212 and the second positive polarity coupling mechanism 214 included in the device 216, respectively. In one embodiment, the first negative polarity coupling mechanism 208 may be sized slightly larger than the second negative polarity coupling mechanism 212 to provide friction when coupled to the second negative polarity coupling mechanism 212. Similarly, the first positive polarity coupling mechanism 210 may be sized slightly larger than the second positive polarity coupling mechanism 214 to provide additional friction when coupled to the second negative polarity coupling mechanism 214. Such slight differences in size provide a secure coupling between the mount 202 and the device 216, which effectively prevents the device 216 from being easily decoupled from the device mount 202. In alternative embodiments, the polarities of the first negative polarity coupling mechanism 208 and the second negative polarity coupling mechanism 212 are reversed. Accordingly, if the polarities of the first negative polarity coupling mechanism 208 and the second negative polarity coupling mechanism 212 are reversed, then the polarities of the second negative polarity coupling mechanism 212 and the second positive polarity coupling mechanism 214 are also reversed.

FIG. 2B is an illustration of the device 216 coupled to the device mount 202 via the first negative polarity coupling mechanism 208, the first positive polarity coupling mechanism 210, the second negative polarity coupling mechanism 212, and the second positive polarity coupling mechanism 214, according to one embodiment of the invention. As described in FIG. 2A, the first negative polarity coupling mechanism 208 and the second negative polarity coupling mechanism 212 include a first positive polarity coupling mechanism 210 and a second positive polarity coupling mechanism 214, respectively. The connection point 120 depicts the connection that is established when the first negative polarity coupling mechanism 208 is coupled to the second negative polarity coupling mechanism 212 and the first positive polarity coupling mechanism 210 is coupled to the second positive polarity coupling mechanism 214. As shown in FIG. 2B, the power connection is located at the same location as the coupling mechanism.

In one embodiment, when the first negative polarity coupling mechanism 208 is coupled to the second negative polarity coupling mechanism 212 and the first positive polarity coupling mechanism 210 is coupled to the second positive polarity coupling mechanism 214, power transfer between the device mount 202 and the device 216 begins automatically. Power may be transferred from the device mount 202 to the device 216 via a power supply associated with the device mount 202 (not shown). In various embodiments, the power supply associated with the device mount 202 may be associated with AC (alternating current) or DC (direct current) power supplied from a wall outlet, a battery pack coupled to or included in the device mount 202, reusable and/or replaceable batteries coupled to or included in the device mount 202, and the like.

The conductive power transfer that occurs between the device mount 202 and the device 216 through the connection point 120 provides a highly efficient power transfer. Specifically, conductive power transfers provide a more efficient power transfer mechanism when compared to inductive power transfers since inductive power transfers experience higher ohmic (i.e., resistive) heating, which decreases power transfer efficiency. Further, conductive power transfer components are less expensive to manufacture than inductive power transfer components.

A close-up illustration of the connection point 220 is also provided in FIG. 2B. As shown, the first negative polarity coupling mechanism 208 is coupled to the second negative polarity coupling mechanism 212, and the first positive polarity coupling mechanism 210 is coupled to the second positive polarity coupling mechanism 214. In some embodiments, the connection point 120 also provides communication capabilities between the device mount 202 and the device 216. In one embodiment, the device mount 202 and the device 216 are capable of transmitting communications signals between one another when coupled together. The communications signals provide a mechanism for transmitting commands from the device mount 202 to the device 216, including recording commands, such as start recording, stop recording, zoom in, zoom out, and the like. Transmitting commands from the device mount 202 to the device 216 advantageously reduces the vibrations or shakes that normally occur when directly manipulating the device 216 while recording when the device 216 is attached to the device mount 202.

Figure 3A:
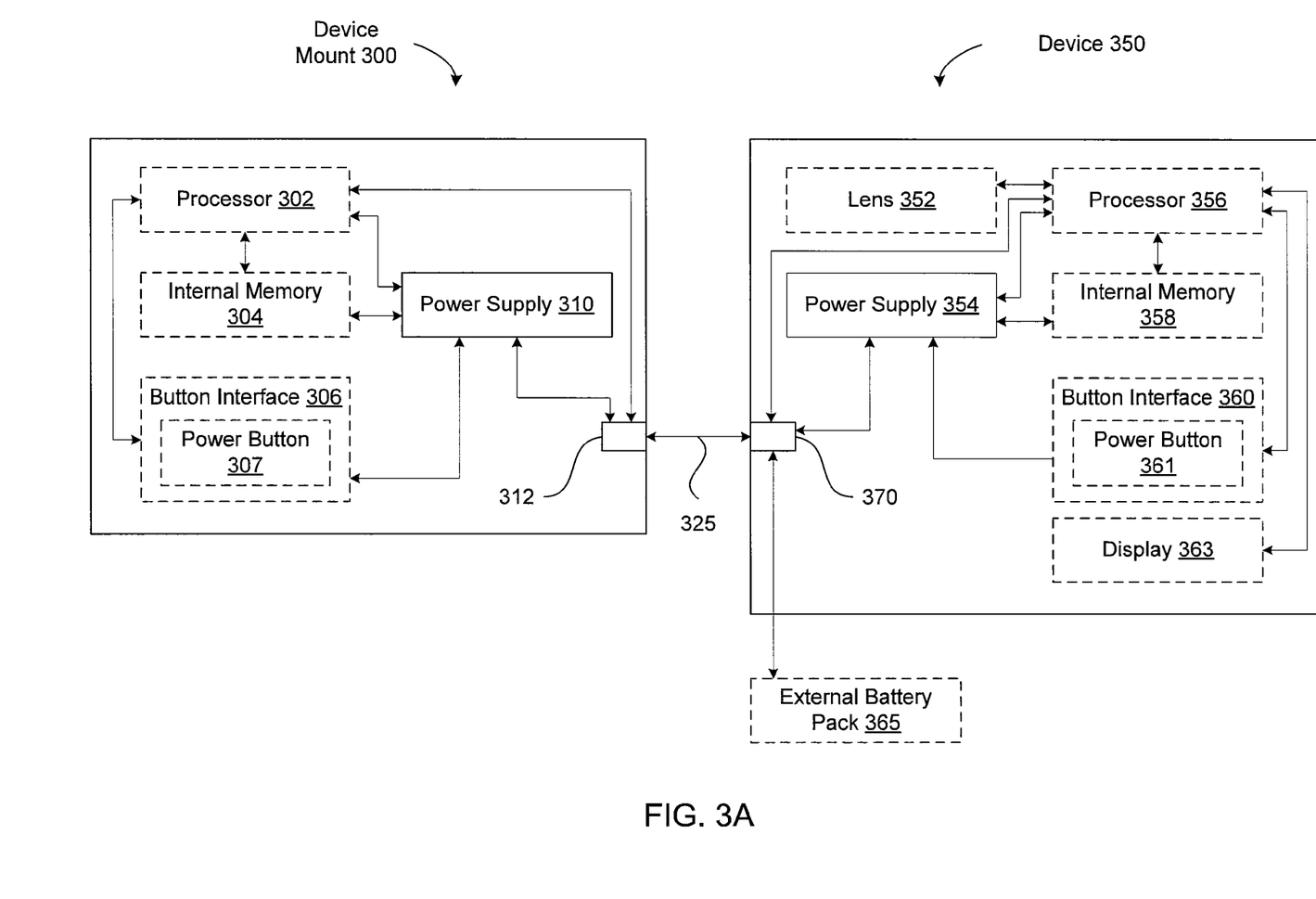
FIG. 3A is a block diagram of a device coupled to a device mount via a single connection, according to one embodiment of the invention.

FIG. 3A is a block diagram of a device 350 coupled to a device mount 300 via a single connection 325, according to one embodiment of the invention. As shown, the device 350 includes a lens 352, a power supply 354, a processor 356, an internal memory 358, a button interface 360, a power button 361, a display 363, and a coupling mechanism 370. In one embodiment, the device 350 is a digital video camcorder that can be charged through the coupling mechanism 370. As also shown, the device mount 300 includes, without limitation, a processor 302, an internal memory 304, a button interface 306, a power button 307, a power supply 310, and a coupling mechanism 312. In one embodiment, the device mount 300 is a tripod that includes charging capabilities to charge the power supply 354 included in the device 350 via the coupling mechanism 312 and the coupling mechanism 370.

The power supply 354 included in the device 350 provides power to the device 350. The power supply 354 also receives power from the coupling mechanism 370. The power supply 354 may be configured to receive power through a battery included in the device 350, an external power source (e.g., the coupling mechanism 312 of the device mount 300), or the like. In one embodiment, the battery is a rechargeable battery that is not removable from the device 350. In some embodiments, a battery is considered not removable when the battery is not user serviceable and/or not intended to be replaced by the user. In alternative embodiments, the battery may include one or more removable and/or replaceable batteries. In some embodiments, a battery is considered removable when the battery is intended to be replaced by the user.

The lens 352, which may include one or more lenses, directs light associated with the scene to a sensor, such as a CMOS sensor, where the sensor is configured to translate the light into electrical signals and transmit the electrical signals to the processor 356 for further processing.

The processor 356 communicates with the various components within the device 350 to control the operations of the device 350. The processor 356 may be implemented as a single chip or as a combination of multiple chips. The processor 356 also processes inputs from the button interface 360. For example, when the device 350 is in a record mode, the processor 356 receives digital audio data and digital video data to create a composite video file. The composite video file may then be transmitted to the internal memory 358 for storage. When the device 350 is in a playback mode, the processor 356 retrieves the composite video file from the internal memory 358 and transmits the video portion of the composite video file to the display 363. In some embodiments, the display 363 comprises an LCD display.

When the device 350 is in playback mode, the display 363 may be configured to display composite video files stored on the device 350. When the device 350 is in record mode, the display 363 may be configured to display an image of the scene being captured while the corresponding composite video file is being recorded.

The button interface 360 may include any number of buttons, such as a power button, playback buttons, record buttons, and settings buttons. The power button 361 is configured to turn the device 350 ON and OFF. In some embodiments, the power button is implemented as a capacitive-touch button. In alternative embodiments, the power button 361 may be implemented as an induction button, an analog-resistive button, or any other technically feasible button type that can be engaged by the user.

The internal memory 358 stores the composite video files as well as firmware that is executed by the processor 356 to control the operations of the device 350. The internal memory 358 comprises either volatile memory, such as dynamic random access memory (DRAM), or non-volatile memory, such as a hard disk or a flash memory module, or a combination of both volatile and non-volatile memory. The internal memory 358 also stores a software driver implemented as a set of program instructions configured to coordinate operation between the button interface 360 and the other components of the device 350, as described in greater detail herein. For example, the program instructions may be executed by the processor 356 to cause different composite video file thumbnails to be displayed in the display 363.

Also, device 350 may be coupled to an optional external battery pack 365. In some embodiments, the power supply 310 of the device mount 300 is configured to charge additional power supplies associated with the device 350, other than the internal power supply 354, such as the optional external battery pack 365.

The device 350, described in FIG. 3A, provides only one example of a device that can be charged via the device mount 300, in accordance with embodiments of the invention. A number of other devices, having any number of different elements, are also within the scope of embodiments of the invention.

Turning now to the device mount 300, the power supply 310 included in the device mount 300 is configured to provide power to the power supply 354 included in the device 350 when the device mount 300 is coupled to the device 350 via the coupling mechanism 312 and the coupling mechanism 370, as depicted by connection 325. The power provided by the power supply 310 may be provided by a battery or an external power source such as a wall socket, a solar panel, or the like. In one embodiment, the battery may be included in one or more legs of the device mount 300. In some embodiments, the battery is a rechargeable battery that is not removable from the device mount 300. In alternative embodiments, the battery may include one or more removable and/or replaceable batteries. Thus, as shown in FIG. 3A, the connection 325 provides both the physical connection that physically supports the device 350 on the device mount 300 as well as the power connection that transfers power from the power supply 310 included in the device mount 300 to the power supply 354 included in the device 350.

The processor 302 communicates with the various components within the device mount 300 to control the operations of the device mount 300. The processor 356 may be implemented as a single chip or as a combination of multiple chips. The processor 356 also processes inputs from the button interface 306 that can be used to control the device 350 through the connection 325. For example, when the device 350 is in a record mode, the button interface 306 can be used to control the recording parameters of the device 350, such as start recording, stop recording, zoom in, zoom out, and the like. When the device mount 300 is in a playback mode, the button interface 306 can be used to control the playback parameters of the device 350, such as play, pause, stop, fast forward, rewind, volume up, volume down, and the like.

The button interface 306 may include any number of buttons, such as a power button, playback buttons, and record buttons, among others. In one embodiment, the interface buttons are physically located on a leg of the device mount 300 so that the user of the device 350 can modify the operation of the device 350 without compromising with the steadiness of the device 350 when recording video or taking photos. The power button 307 may be configured to turn the device mount 300 ON or OFF and/or to turn the device 350 ON or OFF. In some embodiments, the power button is implemented as a capacitive-touch button. In alternative embodiments, the power button 307 may be implemented as an induction button, an analog-resistive button, or any other technically feasible button type that can be engaged by the user.

The internal memory 304 stores firmware that is executed by the processor 302 to transmit control commands to the device 350 via the connection 325. The internal memory 304 comprises either volatile memory, such as dynamic random access memory (DRAM), or non-volatile memory, such as a hard disk or a flash memory module, or a combination of both volatile and non-volatile memory. The internal memory 304 also stores a software driver implemented as a set of program instructions configured to coordinate operation between the interface buttons 306 and the other components of the device mount 300, as described in greater detail herein. For example, the program instructions may be executed by the processor 302 to cause the device mount 300 to electronically rotate the device 350 to produce panoramic images if a motorized head section is included in the device mount 300.

The device mount 300, described in FIG. 3A, provides only one example of a device mount, in accordance with embodiments of the invention. Any other device mounts, having any number of different elements, are also within the scope of embodiments of the invention. In addition, some of the elements shown in FIG. 3A, such as the processors 302, 356, the internal memories 304, 358, the button interfaces 306, 360, lens 352, and the display 363, are depicted with dotted lines indicating that, in various embodiments, one or more of these elements is optional and is not included in the device mount 300 and/or the device 300.

Figure 3B:
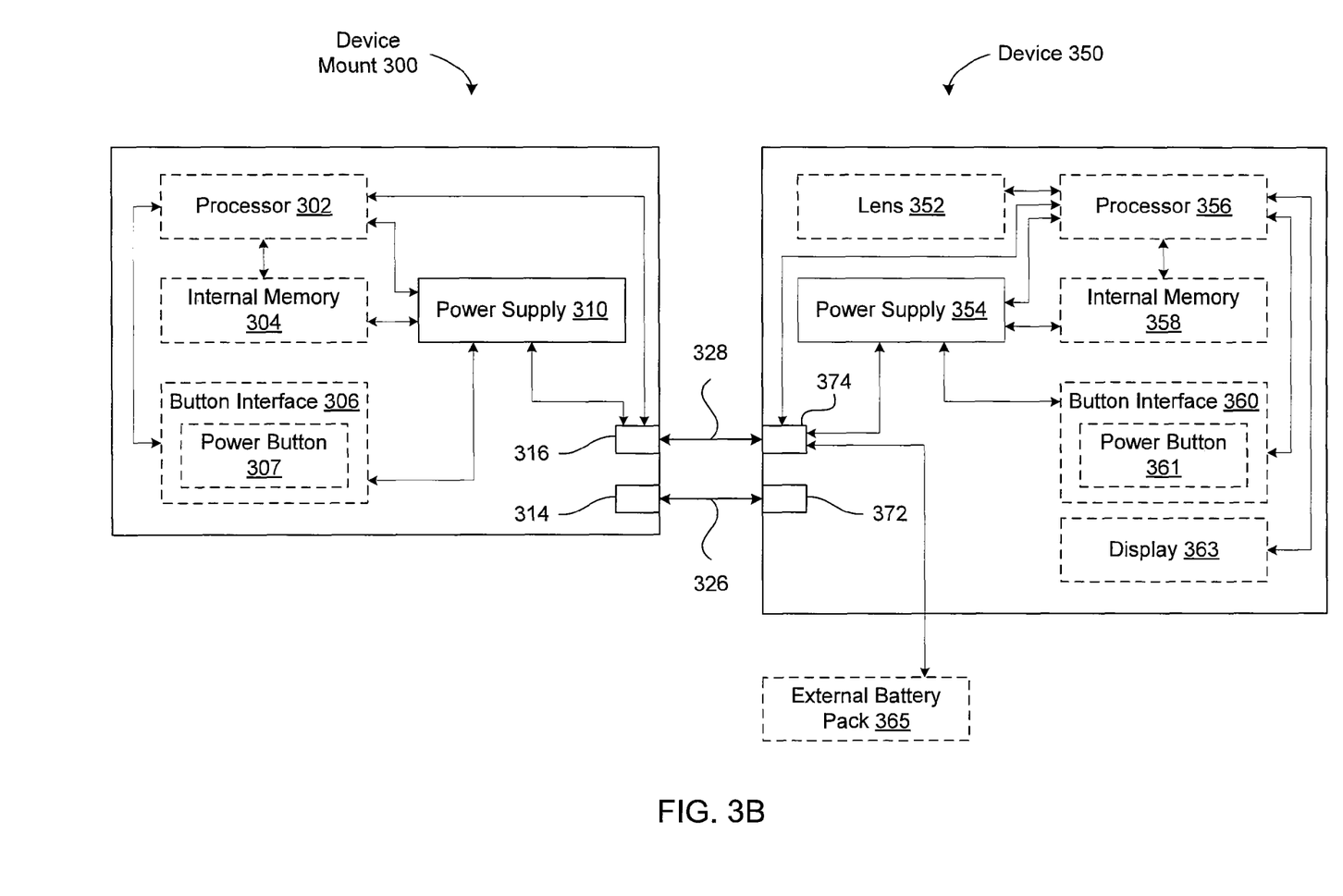
FIG. 3B is a block diagram of a device coupled to a device mount via two separate connections, according to one embodiment of the invention.

FIG. 3B is a block diagram of the device 350 coupled to a device mount 300 via two separate connections 325 and 326, according to one embodiment of the invention. As described above in FIG. 3A, the device 350 in FIG. 3B includes the lens 352, the power supply 354, the processor 356, the internal memory 358, the button interface 360, the power button 361, and the display 363. As shown in FIG. 3B, the device 350 also includes electrical connection 374, and coupling mechanism 372. In one embodiment, the device 350 is a digital video camcorder or a digital camera that can be charged through the electrical connection 374. As also described in FIG. 3A, the device mount 300 in FIG. 3B includes, without limitation, the processor 302, the internal memory 304, the button interface 306, the power button 307, and the power supply 310. The device mount 300 further includes an electrical connection 316 and a coupling mechanism 314. In one embodiment, the device mount 300 is a tripod that includes charging capabilities to charge the power supply 354 included in the device 350 via the electrical connection 316 and the electrical connection 374.

The power supply 354 included in the device 350 provides power to the device 350. The power supply 354 is configured to receive power and/or recharge via the electrical connection 370 included in the device 350. As described, the power supply 354 may be configured to receive power through a battery included in the device 350, an external power source (e.g., the electrical connection 312 of the device mount 300), or the like.

As described herein, the power supply 310 included in the device mount 300 is configured to provide power to the power supply 354 included in the device 350 when the device mount 300 is connected to the device 350 via the electrical connection 316 and the electrical connection 374, as depicted by connection 328. A separate physical connection 326 secures the device 350 to the device mount 300 via the coupling mechanisms 372 and 314. The coupling mechanism 372 and the coupling mechanism 314 are configured as any technically feasible coupling mechanisms, including latches, plugs, switches, a friction fit, or the like. The connection 328 may provide additional support when securing the device 350 to the device mount 300. Thus, as shown in FIG. 3B, in one embodiment, one connection 326 provides the physical connection that physically supports the device 350 on the device mount 300, and a separate connection 328 allows for power transfer from the power supply 310 included in the device mount 300 to the power supply 354 included in the device 350. An illustration and description of such separate electrical connection and coupling mechanism is described in further detail below in FIG. 4.

Figure 4:
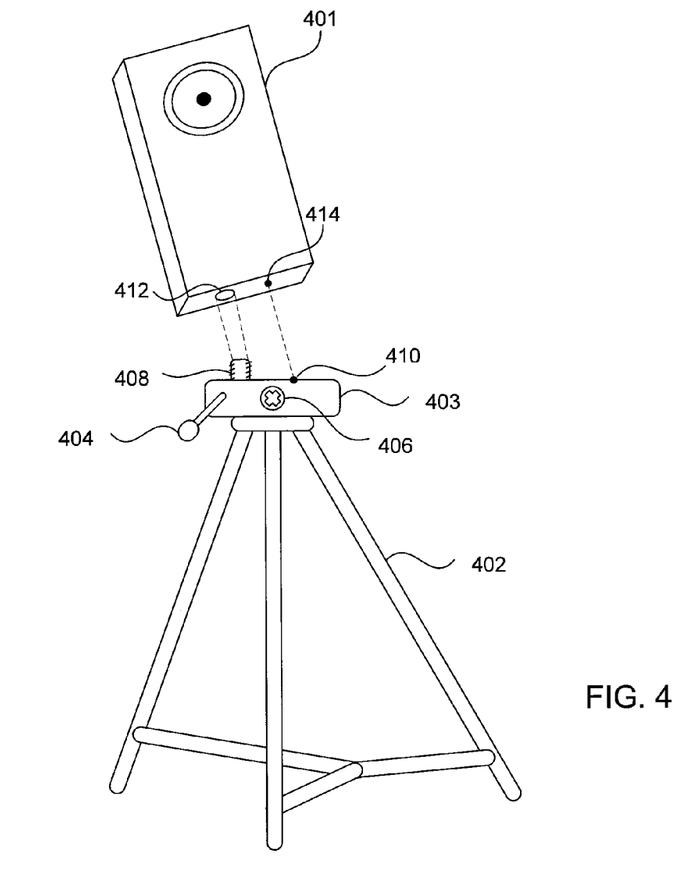
FIG. 4 is a conceptual diagram illustrating coupling a device to a device mount and charging the device via two separate connections, according to one embodiment of the invention.

FIG. 4 is a conceptual diagram illustrating coupling a device 401 to a device mount 402 and charging the device 401 via two separate connections, according to one embodiment of the invention. As shown, the device 401 includes coupling mechanism 412 and electrical connection location 414. The device mount 402 includes a head 403, an adjustment lever 404, a lock wheel 406, a coupling mechanism 408, and an electrical connection location 410.

The device 401 may be any electronic device that can be coupled to the device mount 402. In the embodiment shown in FIG. 4, the device 401 is coupled to the device mount 402 via the coupling mechanisms 408 and 412. Each of coupling mechanisms 408 and 412 may be any technically feasible coupling mechanisms, including a device mounting adapter, a latch, a plug, a switch, a thread, or the like. The device mount 402 provides stability to the device 401 when the device 416 is coupled to the device mount 402 via the coupling mechanisms 408 and 412.

The device 401 is powered by and/or communicates with the device mount 402 via the electrical connection locations 410 and 414. The electrical connection locations 410 and 414 may be any technically feasible electrical connections, including inductive and/or conductive connections. These electrical connections may also provide additional stability to the device 401 in conjunction with the coupling mechanisms 408 and 412 described above. For example, the electrical connection locations may be associated with a data connector.

Figure 5:
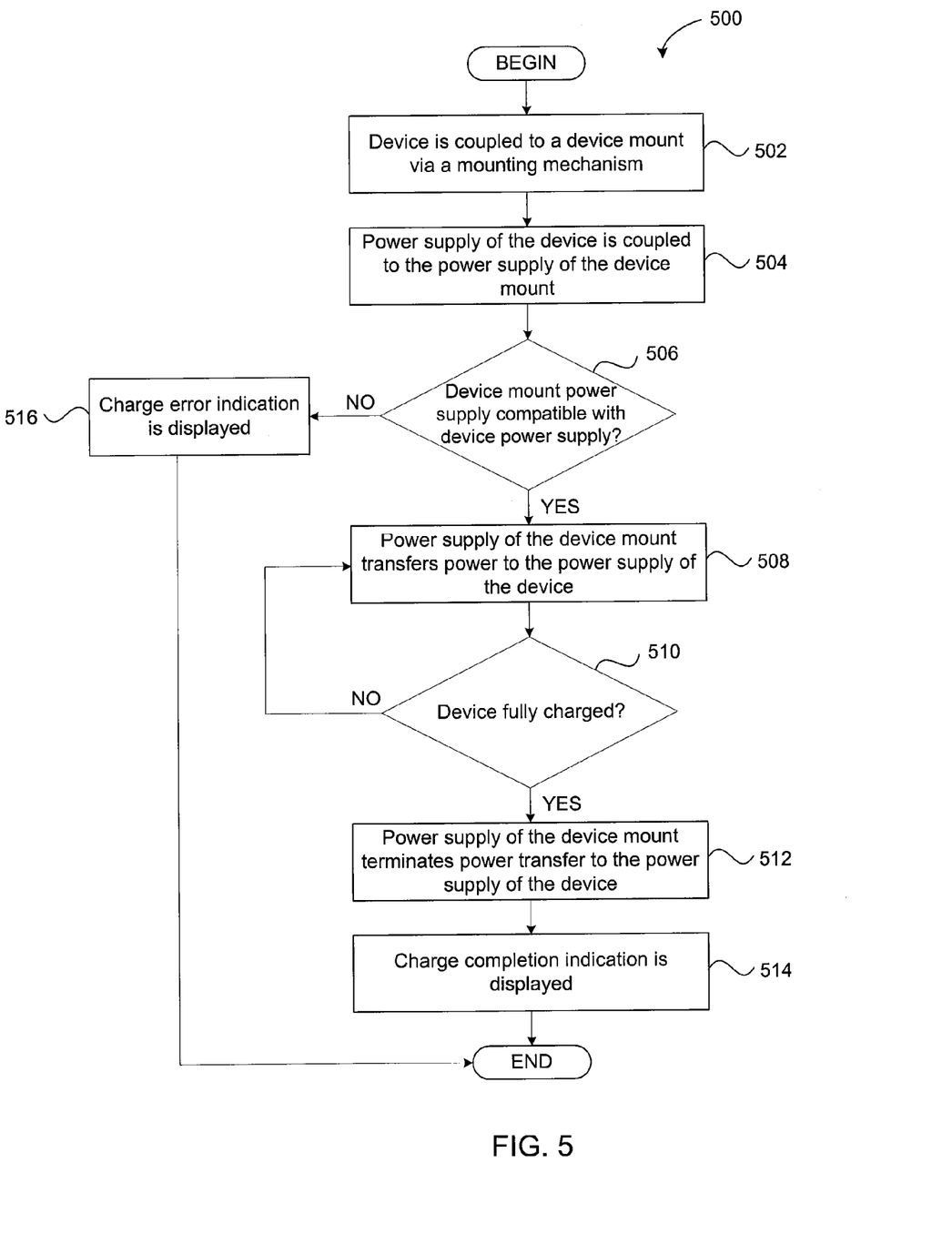
FIG. 5 is a flow diagram of method steps for charging a device by coupling the device to a device mount, according to one embodiment of the invention.

FIG. 5 is a flow diagram of method steps for charging a device by coupling the device to a device mount, according to one embodiment of the invention. Persons skilled in the art will understand that, even though the method 500 is described in conjunction with the systems of FIGS. 1A-4, any system configured to perform the method steps, in any order, is within the scope of embodiments of the invention.

As shown, the method 500 begins at step 502, where a device is coupled to a device mount via a mounting mechanism. In some embodiments, the device comprises a digital video camcorder (DVC). In some embodiments, the device mount comprises a tripod. In some embodiments, the mounting mechanism may include a charging mechanism at the same location as the mounting mechanism, as described in FIGS. 1A-2B. In other embodiments, the mounting mechanism is separate and distinct from the inductive or conductive charging mechanism and is located at a location other than the location of the charging mechanism, as described in FIGS. 3B-4.

At step 504, the power supply of the device is coupled to the power supply of the device mount via a power connection. In some embodiments, the power connection is established when the device is coupled to the device mount, described above in step 502. In one embodiment, a processor included in the device may be configured to detect that the device is coupled to the device mount and that the power connection has been established. In one embodiment, the power connection is located within the mounting mechanism. In other embodiments, the power connection is separate from and located at a different location than the mounting mechanism.

At step 506, the power supply of the device determines whether the power supply of the device mount is compatible with the power supply of the device. In one embodiment, the power supply of the device determines that the power supply of the device mount is compatible with the power supply of the device when the voltage and amperage requirements of the power supply of the device can be provided by the power supply of the device mount. For example, the power supply of the device may measure the resistance exhibited by the power supply of the device mount. In alternative embodiments, at step 506, the power supply of the device mount determines whether the power supply of the device mount is compatible with the power supply of the device.

If the power supply of the device determines that the power supply of the device mount is not compatible with the power supply of the device, then the method 500 proceeds to step 516. At step 516, the device displays a charge error indication. In one embodiment, the device displays the charge error indication on a screen included in the device. In another embodiment, the device mount displays the charge error indication. The method 500 then terminates.

If, at step 506, the power supply of the device determines that the power supply of the device mount is compatible with the power supply of the device, then the method 500 proceeds to step 508.

At step 508, the power supply of the device mount begins transferring power from the power supply of the device mount to the power supply of the device. In one embodiment, the power supply of the device mount receives its power from a battery system including one or more batteries that is built into the legs of the device mount. In various embodiments, the one or more batteries may be replaceable and/or rechargeable and not replaceable. In another embodiment, the power supply of the device mount receives power from a solar panel that is attached to the device mount.

When the power supply of the device receives power from the power supply of the device mount, the power supply of the device routes the received power to a battery system included in the device to charge the battery system included in the device. In some embodiments, the device is coupled to an external battery pack that provides power to the device, in addition to the battery system included in the device. In some embodiments, when the battery system included in the device is fully charged, the power received by the power supply of the device from the power supply of the device mount may be provided to the external battery pack to charge the external battery pack. In other embodiments in which the device is coupled to the external battery pack, when the when the external battery pack is fully charged, the power received by the power supply of the device from the power supply of the device mount may be provided to the battery system included in the device to charge the battery system included in the device.

At step 510, the power supply of the device determines whether the battery system of the device is fully charged. In some embodiments, the power supply of the device transmits a charge cutoff signal to the power supply of the device mount to indicate that the power supply of the device is fully charged. If, at step 510, the power supply of the device determines that the battery system of the device is not fully charged, then the method 500 returns to step 508, described above.

If, at step 510, the power supply of the device determines that the battery system of the device is fully charged, then the method 500 proceeds to step 512.

At step 512, the power supply of the device mount terminates the power transfer to the power supply of the device. In some embodiments, the power supply of the device mount is programmed to continue transmitting power to the power supply of the device, even when the battery system of the device is fully charged, in order to maintain a full charge of the battery system of the device while the device is in use. In another embodiment, the power supply of the device mount is programmed to charge any additional power supplies, if present, that are coupled to the device, such as an external battery pack.

At step 514, a charge completion indication is displayed. For example, a solid green light may be displayed on the device, indicating to a user that the power supply of the device is fully charged. In another embodiment, the power supply of the device mount emits an audible indication that the power supply of the device is fully charged. The method 500 then terminates.

According to various embodiments of the invention, one or more of the steps described in FIG. 5 may be implemented in hardware, software, and/or a combination of hardware and software. For example, any of the steps in FIG. 5 may be implemented as a computer program including one or more instructions stored in a memory and executed by a processor.

Figure 6:
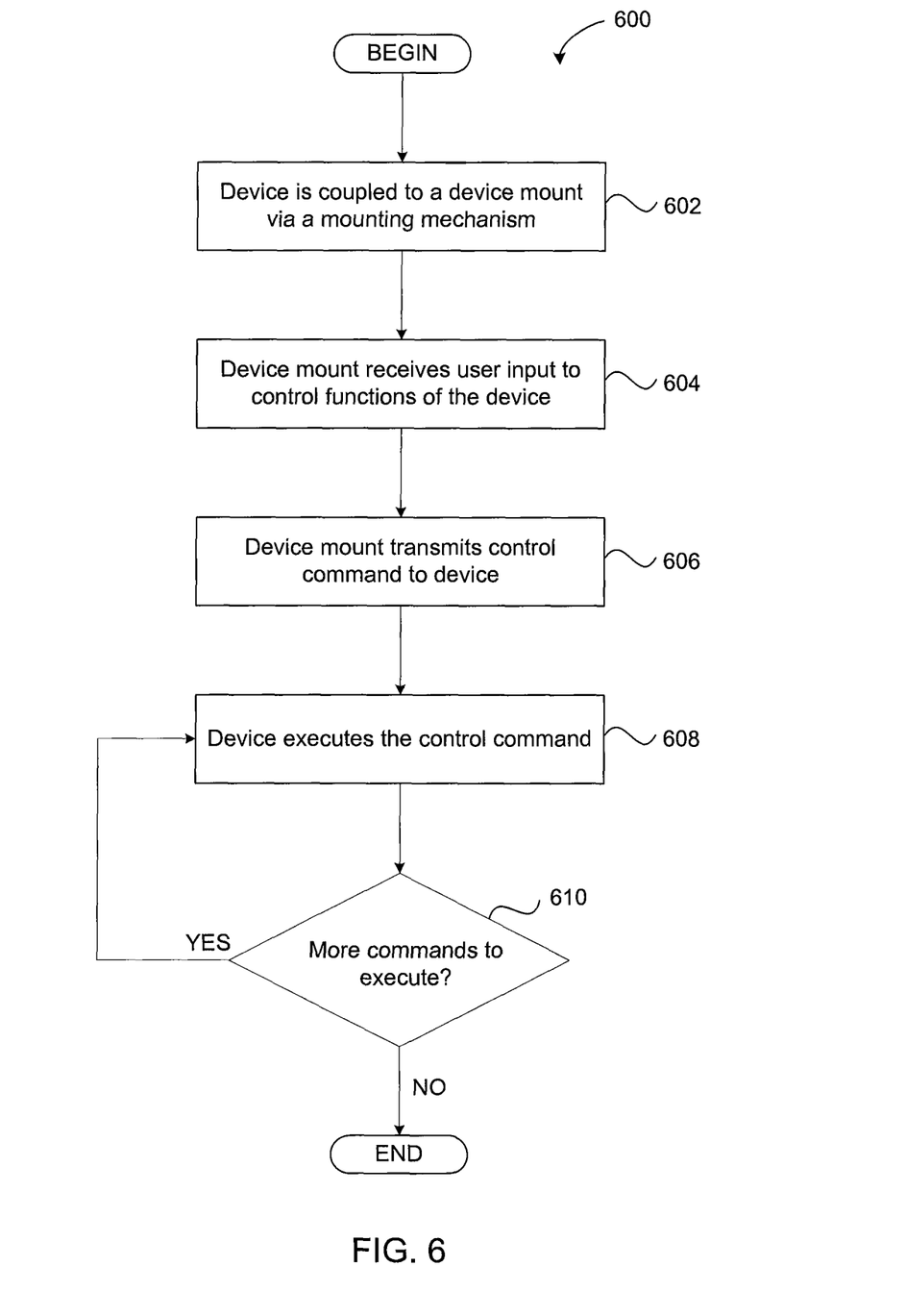
FIG. 6 is a flow diagram of method steps for controlling a device by coupling the device to a device mount, according to one embodiment of the invention.

FIG. 6 is a flow diagram of method steps for controlling a device by coupling the device to a device mount, according to one embodiment of the invention. Persons skilled in the art will understand that, even though the method 500 is described in conjunction with the systems of FIGS. 1A-4, any system configured to perform the method steps, in any order, is within the scope of embodiments of the invention.

As shown, the method 600 begins at step 602, where a device is coupled to a device mount via a mounting mechanism. In some embodiments, the device comprises a digital video camcorder (DVC) or a digital camera. In some embodiments, the device mount comprises a tripod. In some embodiments, the mounting mechanism may comprise and inductive mounting mechanism, as described in FIGS. 1A-1B, or a conductive mounting mechanism, as described in FIGS. 2A-2B. In some embodiments, power can be supplied from a power supply included in the device mount to charge a power supply included in the device, as described in FIG. 5. As described in greater detail herein, in one embodiment, a data communications channel between the device mount and the device is located within the mounting mechanism. In other embodiments, the mounting mechanism is separate and distinct from the data communications channel and is located at a location different than the data communications channel, as described in FIGS. 3B-4.

At step 604, the device mount receives user input to control the functions of the device. In some embodiments, the device mount includes physical buttons that control various functions associated with the device. For example, the buttons on the device mount may be able to control recording and playback functions of the device, such as being/end recording, play, pause, stop, fast-forward, rewind, zoom-in, zoom-out, volume-up, volume-down, and the like.

At step 606, a processor included in the device mount transmits one or more control commands to the device via the data communications channel. In one embodiment, the user of the device mount may presses a physical button located on the device mount, which causes the one or more control commands to be transmitted to the device. As described, in embodiments where the data communications channel is located within the mounting mechanism, the device mount transmits the one or more control commands via the mounting mechanism. In embodiments where the data communications channel is located at a different location than the mounting mechanism, the one or more control commands are transmitted via the separate and distinct data communications channel.

At step 608, a processor included in the device receives a control command that has been transmitted by the processor included in the device mount, and executes the control command. For example, the control command may be associated with a zoom-in function. The processor of the device analyzes the control command and determines that a lens included in the device should be rotated to increase the zoom level, in response to receiving the control command. The processor then causes the lens to be rotated by a motor mount included in the device, in accordance with the control command.

At step 610, the processor included in the device determines whether additional control commands have not been processed. If the processor included in the device determines that at least one control command has not been processed, then the method 600 returns to step 608, described above. If the processor included in the device determines that no additional commands remain to be processed, then the method 600 terminates.

In sum, embodiments of the invention allow a device, such as a digital video camcorder or a digital camera, to be charged via a device mount, such as a tripod. The device mount may include a power supply, such as batteries or a power supply that receives power from a wall outlet. According to embodiments of the invention, a user can mount the device on the device mount and operate the device in the normal manner, while at the same time charging the battery included in the device.

One advantage of embodiments of the invention is that users can operate the device for a longer period of time since the device can be charged while the device is coupled to a device mount. Charging the device via the device mount eliminates the typical requirement to unmount the device to charge the device, which can be time consuming in inconvenient. Another advantage is that the process of recording and playing back videos is made more convenient for the user since the device can be controlled through the device mount. Controlling the device through the device mount reduces the shake or vibration that is typically caused when adjusting the mounted device by hand. Yet another advantage is that demo models of a device, such as "floor-models" on display at a store, can be charged via a demo model mount. In this manner, manufacturing specially-designed floor models is no longer necessary, since the device can be charged through the in-store display mounting mechanism.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A method comprising:
    determining that a device mount power supply included within a device mount is compatible with an electronic device power supply included in an electronic device;
    receiving power transferred from the device mount power supply via a first inductive power connection that is located within a male device mounting adapter, wherein an outside surface of the male device mounting adapter forms a screw that is affixed into a female receptacle of the electronic device, wherein the screw is configured to align the first inductive power connection to a second inductive power connection located in the electronic device to facilitate charging the electronic device power supply; and
    charging the electronic device power supply with power received from the device mount power supply via the first inductive power connection.

2. The method of claim 1, wherein affixing the male device mounting adapter to the female receptacle is configured to secure the electronic device to the device mount as an orientation of the electronic device changes.

3. The method of claim 1, wherein the device mount comprises a base portion and a plurality of legs.

4. The method of claim 1, wherein the device mount power supply comprises one or more batteries.

5. The method of claim 4, wherein the one or more batteries are removable from the device mount.

6. The method of claim 4, wherein the one or more batteries are rechargeable and are not removable from the device mount.

7. The method of claim 1, further comprising receiving control commands transmitted from the device mount via the power connection.

8. The method of claim 7, wherein the control commands cause the electronic device to execute one or more camera functions including at least one of a play function, a pause function, a fast-forward function, a rewind function, and a record function.

9. The method of claim 8, wherein the device mount includes one or more interface buttons configured to receive user input associated with the one or more camera functions.

10. A device mount, comprising:
a first power supply configured to transfer power to a second power supply included in a electronic device via a first inductive power connection; and
a male device mounting adapter comprising an outside surface forming a screw, wherein the screw is configured to mate with a female receptacle of the electronic device, thereby coupling the electronic device to the device mount,
wherein the first inductive power connection is located within the male device mounting adapter,
wherein the second power supply is charged with the power received from the first power supply, and
wherein the male device mounting adapter facilitates proper alignment of the electronic device and the device mount for charging purposes by aligning the first inductive power connection with a second inductive power connection in the electronic device.

11. The device mount of claim 10, wherein the device mount comprises a tripod.

12. An electronic device, comprising:
a first power supply configured to receive power from a second power supply included in a device mount via a first inductive power connection; and
an female receptacle configured to receive a male device mounting adapter comprising an outside surface forming a screw that couples the electronic device to the device mount,
wherein a second inductive power connection in the electronic device is configured to receive power from the first inductive power connection located within the male device mounting adapter,
wherein the first power supply is charged with the power received from the second power supply, and
wherein the male device mounting adapter facilitates proper alignment of the electronic device and the device mount for charging purposes by aligning the first inductive power connection with the second inductive power connection.

13. The electronic device of claim 12, wherein the device mount comprises a tripod.

14. The electronic device of claim 12, wherein the electronic device comprises a digital video camcorder.

* * * * *

UNITED STATES PATENT AND TRADEMARK OFFICE
CERTIFICATE OF CORRECTION

| | | |
|---|---|---|
| PATENT NO. | : 8,432,483 B2 | |
| APPLICATION NO. | : 12/837384 | |
| DATED | : April 30, 2013 | |
| INVENTOR(S) | : Chu | |

It is certified that error appears in the above-identified patent and that said Letters Patent is hereby corrected as shown below:

In the Specifications:

In Description of Example Embodiments:

Column 3, Line 32, please insert --a-- after be;

In Claims:

Column 15, Claim 10, Line 17, please delete "a" after in and insert --an-- therefor;

Column 16, Claim 12, Line 10, please delete "an" and insert --a-- therefor.

Signed and Sealed this
Twenty-fifth Day of June, 2013

Teresa Stanek Rea
*Acting Director of the United States Patent and Trademark Office*